2,972,633

CONVERSION OF A PINANE ALCOHOL

Eugene A. Klein, West Los Angeles, Calif., assignor to The Glidden Company, Cleveland, Ohio, a corporation of Ohio No Drawing. Filed July 3, 1957, Ser. No. 669,711

4 Claims. (Cl. 260—601)

The present invention is concerned with the conversion of a pinane alcohol. It is particularly concerned with the conversion of a bicyclic terpene alcohol, that is, verbanol, into acylic derivatives which are useful in the flavor, perfume and pharmaceutical industries.

The simple derivatives of the acyclic terpenes, for example, the oxygenated compounds, have heretofore been obtained principally from the essential oils found in various plants in nature. The oils are obtained by distillation and by working up the distillation products, all of which results in considerable expense. The $C_{10}$ aldehydes and alcohols are examples of important oxygenated acyclic terpene derivatives which are used in large quantities in the perfume and flavor as well as other industries. It would be desirable, therefore, if the more valuable oils could be obtained from less expensive sources and by simpler processes, especially where such processes were less costly than known methods of manufacture.

Accordingly, an object of my invention is the preparation of valuable oxygenated acyclic terpene compounds by a simple process and from an inexpensive source.

A further object of my invention is the conversion of verbanol to novel and valuable compounds of the oxygenated acyclic type.

Another object of my invention is the preparation of novel oxygenated acyclic terpenes which are useful in the flavor and perfume industries by a simple and inexpensive process. Other objects will become apparent from a description of my invention to be given hereinafter.

In accordance with the foregoing, I have found that I can prepare novel oxygenated acyclic terpenes from verbanol, by a process comprising heating said alcohol under pyrolyzing conditions. By the process of my invention, I have succeeded in preparing unexpected and valuable reaction products from verbanol, as will be more fully understood by reference to specific examples to be given hereinafter.

In a broad embodiment of my invention, my process for preparing the novel products described hereinafter comprises pyrolyzing verbanol under conditions that result in the isomerization of the alcohol to produce $C_{10}$ acyclic products and thereafter recovering said products.

The starting material for the process of my invention, that is, verbanol, is well known and can be obtained by well-known methods. It can be prepared, for example, by the reduction reaction of verbanol with hydrogen and a catalyst; for example, palladium. Such reduction reactions have heretofore been described, and reference can be had to the literature for further details. The product, verbanol, can be obtained as a mixture of isomerides or as a relatively pure material by selecting appropriate reducing catalysts and reactants and/or reaction conditions. Thus, the bicyclic alcohol can be obtained in optically active or racemic form, or mixtures, as will be understood by those skilled in the art.

In the preferred embodiment of my invention, I have found that I can isomerize verbanol at temperatures of from 350° to 700° C., depending upon the time to which the verbanol is subjected to the thermal isomerizing temperature. Thus, at 400° C., I can employ liquid phase pyrolysis whereby verbanol is heated in an autoclave under autogenous pressure for, say, 1 to 3 hours. At somewhat higher temperatures, say, 450° C., the time required would be much less and might be in the order of, say, ½ minute to several minutes. At still higher temperatures, for example 550° or 600° C., the verbanol can be subjected to treatment for only a small fraction of a second. While liquid phase pyrolysis of verbanol is satisfactory at the lower temperature ranges, it is much less satisfactory at the higher temperature ranges where the autogenous pressure developed would be very high, and it would be more mechanically difficult to subject the liquid to high temperatures for very short periods of time. Therefore, when employing temperatures of 500° C. or higher, I prefer to vaporize the verbanol at relatively low pressures, say, atmospheric or subatmospheric, and pass the verbanol vapors through a tube heated to the appropriate temperature. I can vary the time of treatment by varying the design of the tube or by varying the flow of vapors through the tube. It will be appreciated by those skilled in the art that it is difficult to measure the temperature of treatment where temperatures of, say, 500° or higher are employed. As is known, radiation effects and related phenomena tend to greatly reduce the accuracy of temperature measurement at such higher temperatures. I therefore employ a thermometer of good quality and adjust the temperature of the tube to a fixed, though perhaps erroneous value and then adjust the flow of vapors through the tube so that the product is substantially isomerized as determined by assay of the product. The product is readily assayed by conventional instrumental analysis, such as ultraviolet, infrared or vapor chromatography. It can also be assayed by conventional chemical methods, such as determination of percent aldehyde, percent unsaturation, etc. Having established suitable conditions for the pyrolysis using the particular pyrolysis design, I adhere to the arbitrary flow and temperature conditions chosen as representing optimum pyrolysis for this unit. It can be shown that if about 30 gallons of isoverbanol are vaporized per hour and the vapors are passed through a tube of ⅝" diameter and 10 feet long and at a temperature of about 600° C., the product will be largely isomerized under these conditions. Since there is some restriction of flow imposed by the small diameter of the tube and by its length, the vaporization temperature for the verbanol will be somewhat above its boiling point at atmospheric pressure unless a vacuum is applied to the condenser of the pyrolysis unit.

The mixture obtained by the isomerization reaction can be thereafter, in accordance with my invention, be recovered such as by fractional distillation, preferably vacuum distillation.

The thermal conversion of the verbanol need not be complete, and, in general, I find it convenient to secure only partial, though substantial, conversion of the alcohol to the desired isomeric acyclic compounds and then recover the desired compounds. It is also within the scope of my invention to recycle unreacted verbanol to obtain a more thorough conversion, or to increase temperatures or contact times, etc. to obtain the same result. The recovery of the converted materials, or fractions enriched with them, can be effected by physical or chemical means, a suitable method being fractional distillation with an efficient column, and as heretofore indicated, preferably vacuum distillation.

In order that the process of my invention be more fully understood, reference is made to the following specific examples. It should be understood, however, that recitation of specific temperatures, pressures and reactant materials are by way of illustration and not by way of limitation.

*Example 1*

Samples of verbanol, which had been prepared from optically active 1-verbenol by hydrogenation over a $PtO_2$ catalyst, were pyrolyzed at 400°, 460° and 520° C. by adding the material dropwise at 2 to 3 cc. per minute down the side of a heated, vertical one-fourth inch standard iron pipe. The verbanol added dropwise is vaporized from the side of the pipe and within a few inches of its point of introduction. The temperature of pyrolysis was determined from a thermocouple inserted down the center of the pipe. Infrared spectra were made of each of the pyrolysates and these indicated the total isomerization as well as various structural features of the products. At 400° C., for example, there was very little isomerization, while with increasing temperature there was more isomerization, as indicated by the retention of less alcohol and the increased formation of non-conjugated aldehydes; a total of about 25% of aldehyde being obtained in the sample isomerized at 520° C.

*Example 2*

Using the same procedure as in Example 1, 407 grams of verbanol was pyrolyzed at a temperature of from 450 to 470° C. Infrared analysis of the total pyrolysate showed about 70 to 80 percent alcohols and about 20 percent carbonyls.

The pyrolysate obtained by the above procedure was fractionated through an efficient column packed with Pyrex glass helices and twenty fractions were collected ranging in size from 3 to 32 grams. The boiling points of these fractions ranged from 58 to 102° C. at 10 mm. absolute pressure. Infrared spectra made showed the following compounds present as well as their structural features:

A non-conjugated acyclic aldehyde of the empirical formula $C_{10}H_{18}O$; B.P. between 73 to 81° C. at 10 mm.; semicarbazone (uncorr.) 116° C.; 19% yield. The aldehyde was purified by combining the fractions containing it and shaking them with a saturated solution of sodium bisulfite containing a small amount of sodium carbonate. The addition compound, which precipitated almost immediately, was filtered and washed with light naphtha. The aldehyde was then regenerated by adding a 15% potassium carbonate solution to the bisulfite compound suspended in water and light naphtha. The solvent was then removed from the light naphtha solution to yield a pure aldehyde which had the same odor as citronellal. An infrared spectrum of the pure aldehyde showed it to contain its major absorption bands at the following wavelengths ($\mu$): 5.85; 6.88; 6.97; 7.20; 7.28; 7.49; 7.95; 8.20; 8.38; 9.0; 9.38; 9.8 (broad); 10.12 (broad); 10.45; 10.96; and 11.77.

A sample of the aldehyde was reduced with hydrogen at a pressure of 60 lbs./sq. in. in the presence of a platinum oxide catalyst. The sample consumed one mole of hydrogen per mole of sample, although after this reduction, it was still unsaturated to bromine. An infrared spectrum of the reduced product showed that the aldehyde had been converted to a primary alcohol with its major absorption bands at the following wavelengths ($\mu$): 3.0 (broad); 6.90 (broad); 7.07; 7.20; 7.27; 7.49; 9.0; 9.47; 9.70–10.50 (several indistinct bands); and 11.80.

3,7-dimethyl-1,6-octadien-5-ol, B.P. 87 to 95° C. at 10 mm.; $n_D^{25}$ 1.4590, $\alpha_D$ −6 to −7° (10 cm. tube); 26% yield: An infrared spectrum of this material showed it to have its major absorption bands at the following wavelengths ($\mu$): 3.0 (broad); 6.08; 6.9 (broad); 7.04; 7.26; 7.47; 7.73 (broad); 7.90; 8.12; 8.34; 8.80; 9.15; 9.33; 9.55; 9.83; 10.08 (broad); 10.62; 10.95; 11.82; and 12.0.

A sample of this alcohol was reduced with hydrogen at 60 lbs./sq. in. pressure in the presence of a platinum oxide catalyst. The sample absorbed two moles of hydrogen per mole of alcohol. An infrared spectrum of the reduced alcohol showed it to be identical with the spectrum of a known sample of tetrahydrotagetol and it was identified as such.

Unidentified alcohol: This alcohol was present in the semi-crystalline fractions boiling between 97 to 100° C. at 10 mm. The compound, which was concentrated in the liquid phase or the mother liquors of these fractions, was concentrated by filtering the combined fractions in this boiling range. An infrared spectrum of the filtrate had its major absorption bands at the following wavelengths ($\mu$): 3.0 (broad); 6.05; 6.80; 6.86; 7.04; 7.26; 7.45; 7.72; 7.90; 8.20; 8.40; 8.65; 8.82; 9.03; 9.30 (broad); 9.65; 10.03; 10.63; 10.95; 11.25; and 11.72.

The unidentified alcohol was reduced with hydrogen at a pressure of about 60 lbs./sq. in. in the presence of a platinum oxide catalyst. An infrared spectrum of the reduced product had its major absorption bands at the following wavelengths ($\mu$): 3.0 (broad); 6.87; 7.06; 7.28; 7.52; 7.72; 7.92; 8.20; 8.35; 8.48; 8.67; 8.82; 9.03; 9.16; 9.55; 9.66; 9.77; 10.05; 10.68; 10.87; 11.32; and 11.70.

It was noted that the major component of the reduced sample was verbanol, but the unidentified alcohol was characterized as having a methylene group ($>C=CH_2$) by the disappearance on reduction of the infrared bands at 6.05; 10.95 and 12.25$\mu$.

Verbanol was the major component boiling between 100 to 102° C. at 10 mm. The compound was identified by comparison with an infrared spectra of a known sample of pure verbanol.

Thus, a summary of the distillation and spectral data showed the pyrolysate to have the following approximate composition:

| Compound: | Percent |
|---|---|
| Non-conjugated acyclic aldehyde | 19 |
| 3,7-dimethyl-1,6-octadien-5-ol | 26 |
| Unidentified alcohol | 10 |
| Unchanged verbanol | 20 |
| Low boiling fragments (loss) | 25 |
| | 100 |

One of the isomerization products of this invention, i.e., the $C_{10}$ aldehyde, and the fraction containing it, has an odor similar to citronellal. As such, this $C_{10}$ aldehyde and the fraction containing it can be employed as an odor ingredient in soaps and perfumes. Additionally, the aldehyde can readily be condensed with acetaldehyde, acetone and the like compounds to produce new condensation products which are also useful in perfumery.

The novel 3,7-dimethyl-1,6-octadiene-5-ol is also useful as a perfume or odor imparting ingredient in soaps and the like. It can be oxidized to a tagetone, or esterified to produce products having perfumery value. Also, it can be hydrogenated to tetrahydrotagetol, a known product, which can thereafter be esterified to produce an ester(s) having perfumery value. Thus, all of the products of my invention resulting from the conversion of a bicyclic terpene alcohol consisting of verbanol are useful in the scent or odor imparting chemical field.

Resort can be had to modifications and equivalents falling within the scope of my invention.

I claim:
1. A process for preparing a mixture comprising 3,7-dimethyl-1,6-octadiene-5-ol and a $C_{10}H_{18}O$ non-conjugated aldehyde having a boiling point between 73° to 81° C. at 10 mm. pressure which comprises heating verbanol at a temperature of from 350° to about 700° C. for a period of time sufficient to produce said mixture.

2. A process according to claim 1 wherein the verbanol is heated to a temperature of above about 350° C. to about 600° C.

3. A process according to claim 2 wherein verbanol is heated in the liquid phase.

4. A process according to claim 1 wherein the verbanol is heated in the vapor phase.

References Cited in the file of this patent

UNITED STATES PATENTS

| | | |
|---|---|---|
| 2,340,294 | Bain | Feb. 1, 1944 |
| 2,453,110 | Bain et al. | Nov. 9, 1948 |
| 2,537,638 | Kitchen | Jan. 9, 1951 |
| 2,815,383 | Booth et al. | Dec. 3, 1957 |
| 2,821,547 | Klein | Jan. 28, 1958 |

OTHER REFERENCES

Simonsen: The Terpenes, vol. I, 2nd ed. (1953), pp. 26, 57, 71.